(12) United States Patent
Takagi et al.

(10) Patent No.: US 7,636,510 B2
(45) Date of Patent: Dec. 22, 2009

(54) PRIVATE VIDEO RECORDER USING CONTENT SEGMENT POINTING INFORMATION TO RECORD, EDIT AND REPRODUCE CONTENT

(75) Inventors: Toshihiro Takagi, Daito (JP); Kenichiro Okabe, Daito (JP); Yoshihisa Nagamura, Daito (JP); Kazuhiko Tani, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 1322 days.

(21) Appl. No.: 10/353,066

(22) Filed: Jan. 29, 2003

(65) Prior Publication Data

US 2003/0172383 A1     Sep. 11, 2003

(30) Foreign Application Priority Data

Jan. 30, 2002   (JP)   ............... 2002-021014

(51) Int. Cl.
*H04N 5/93* (2006.01)
*H04N 5/91* (2006.01)

(52) U.S. Cl. .................. 386/55; 386/46; 386/52; 386/95; 386/125

(58) Field of Classification Search .............. 386/55, 386/95–96, 52, 125–126, 1, 33, 46, 56; 717/174
See application file for complete search history.

(56) References Cited

U.S. PATENT DOCUMENTS

| | | | | |
|---|---|---|---|---|
| 4,750,213 A | * | 6/1988 | Novak | 455/3.01 |
| 5,172,111 A | * | 12/1992 | Olivo, Jr. | 386/126 |
| 5,966,495 A | * | 10/1999 | Takahashi et al. | 386/68 |
| 6,233,389 B1 | * | 5/2001 | Barton et al. | 386/46 |
| 6,374,037 B1 | * | 4/2002 | Okada et al. | 386/95 |
| 6,490,722 B1 | * | 12/2002 | Barton et al. | 717/174 |
| 6,642,939 B1 | * | 11/2003 | Vallone et al. | 715/721 |
| 6,714,720 B1 | * | 3/2004 | Lightstone et al. | 386/46 |
| 7,051,047 B2 | * | 5/2006 | Jung et al. | 707/104.1 |
| 7,286,748 B2 | * | 10/2007 | Srinivasan et al. | 386/69 |

FOREIGN PATENT DOCUMENTS

| | | |
|---|---|---|
| JP | 05-308602 | 11/1993 |
| JP | 2713163 | 10/1997 |
| JP | 10-234007 | 9/1998 |
| JP | 10-276402 | 10/1998 |
| JP | 11-184737 | 7/1999 |
| JP | 2001-008122 | 1/2001 |
| JP | 2001-060381 | 3/2001 |
| JP | 2001-093264 | 4/2001 |
| JP | 2001-157152 | 6/2001 |
| JP | 2001-238172 | 8/2001 |
| JP | 2001-352517 | 12/2001 |

* cited by examiner

*Primary Examiner*—Andrew Faile
*Assistant Examiner*—Jamie J Vent Atala
(74) *Attorney, Agent, or Firm*—Crowell & Moring LLP

(57) ABSTRACT

In a private video recorder for recording contents of TV program delivered from TV stations, data of the contents of TV program (contents data) are memorized into segments in a contents data memory area, and the contents data are controlled as one video picture file by appointing the segments memorizing the contents data in segment appointing information of the video picture file. When the contents recorded in the private video recorder is edited, only the appointment of the segments in the segment appointing information is rewritten without cutting, copying or inserting the contents data.

8 Claims, 7 Drawing Sheets

FIG. 11

| TITLE | | DETAIL | SCOPE |
|---|---|---|---|
| DATE OF RECORDING | | DATE WHEN TOP OF TITLE IS RECORDED | 1/1—12/31 |
| CHANNEL NUMBER | | ATSC, NTSC, LINE | 1—01CH.—125—99CH. LINE |
| RECORDING TIME | | TIME WHEN TOP OF TITLE IS RECORDED | 0:00—11:59 |
| LENGTH OF TITLE | | LENGTH OF CONTENTS IN SEGMENTS | 0H00M—9H59M59S |
| VIEWED/UNVIEWED | | ALREADY VIEWED OR NOT | VIEWED, UNVIEWED |
| LOCK | | ATTRIBUTE OF PROTECTION | PROTECTED, UNPROTECTED |
| INDEX-RESUME | | POINT OF LAST-VIEW | 0H00M01S—9H59M59S |
| INDEX | | BOUNDARY BETWEEN CM AND INDEX, OR INDEX POINT INPUTTED BY USER | 0H00M01S—9H59M59S |
| HIDDEN ATTRIBUTE | YEAR | YEAR OF RECORDING | 2001—2050 |
| | RECORDING MODE | KIND OF RECODING MODE | SP, LP, BIT STREAM |
| CLOSED CAPTION | | TABLE OF LOCATION AND MESSAGE ON A FILE WITH RESPECT TO TIME CODE EXTRACTED FROM ATSC, NTSC, LINE | |
| RATING INFORMATION | | TABLE OF LOCATION AND MESSAGE ON A FILE WITH RESPECT TO TIME CODE EXTRACTED FROM ATSC, NTSC, LINE | |
| KIND OF PROTECTION | | WITH OR WITHOUT OF PROTECTION OF VIEWING | MICRO VISION OR OTHER COPY PROTECTION SIGNAL |
| UTILIZING ELECTRIC PROGRAM GUIDE (EPG) | | | |
| TITLE OF PROGRAM | | TITLE OF PROGRAM OBTAINED FROM EPG | |
| EXPLANATION OF PROGRAM | | EXPLANATION OF PROGRAM OBTAINED FROM EPG | |

PRIVATE VIDEO RECORDER USING CONTENT SEGMENT POINTING INFORMATION TO RECORD, EDIT AND REPRODUCE CONTENT

BACKGROUND OF THE INVENTION

1. Field of the Invention

The present invention relates to a private video recorder for recording contents of TV programs delivered from TV stations.

2. Description of the Related Art

The private video recorder is conventionally configured that the contents (video picture) of TV programs are recorded as video picture files in a contents accumulator (recording medium) such as a hard disc drive apparatus, and the contents recorded in the contents accumulator can be edited by cutting, copying, inserting and so on corresponding to operation of an operation apparatus such as a remote control unit by a user. The contents recorded in or edited by the private video recorder can be reproduced on a monitor of a display apparatus connected to the private video recorder, when the data of the video picture file is read out from the contents accumulator.

The private video recorder constantly memorizes the data corresponding to the contents of TV program (hereinafter abbreviated as "contents data") in a predetermined time period which has been received until the moment in a memory area called "circulation buffer area" in the contents accumulator with no relation to recording of the contents. The contents data, which is temporarily memorized into the circulation buffer area, can be readout from the circulation buffer area until the circulation buffer area is filled by the contents data. Furthermore, new contents data of the TV program just received are serially memorized into the circulation buffer memory, while the contents data already memorized into the circulation buffer area have been readout from the circulation buffer area. By such a configuration, the contents of TV program which has been received can be reproduced as if the contents are paused or rewound.

In the conventional private video recorder, a known file control system such as MS-DOS is used for controlling the video picture files of the contents of TV programs. In the file control system, video data and audio data, which are the substances of the contents data constituting the video picture file, are memorized into and read out from sectors on the recording medium. The sector is the minimum unit of the recording area on the recording medium.

As can be seen from FIG. 10, a memory area of the recording medium is allocated to a control area 91 called "FAT" and a file substance memory area 92 in the file control system of MS-DOS. The control area 91 memorizes control information for controlling the contents data memorized into the file substance memory area 92 as a file. The video data and the audio data, which are the substances of the contents data of the video picture file, are memorized into the file substance memory area 92. The file substance memory area 92 is constituted by a plurality of segments 93. Each segment 93 is further constituted by a predetermined number of the sectors. The segment 93 is the minimum unit for controlling the video picture file, so that the contents data of the video picture file are controlled by the unit of segment 93 in the file substance memory area 92. The control information memorized into the control area 91 includes location information showing positions of the sectors of the segments 93 into which the contents data constituting one video picture file are memorized. The contents data memorized into the segments 93 in the file substance memory area 92 are controlled as one video picture file corresponding to the control information. Each segment 93 is not commonly controlled by a plurality of control information but controlled by only one control information.

When recoding and erasing of the video picture files are repeated in the conventional file control system, the contents data constituting one file are memorized into disintegrative into a plurality of groups of segments 93 which is physically departed from each other. Such a phenomenon is called "fragmentation". When a video picture file having a larger size is recorded after erasing another video picture file having a smaller size, the contents data of the video picture file having the larger size cannot completely be memorized into the segments into which the contents data of the video picture file having the smaller size was memorized, so that the remainder of the contents data the video picture file having the larger size will be memorized into other segments. As a result, the contents data constituting one file are memorized into disintegrative into a plurality of groups of the segments. In FIG. 10, daubed boxes show the segments into which the contents data constituting the same file are memorized. In the conventional private video recorder, the conventional file control system is used not only for memorizing and reading the contents data of the video picture file of the contents of TV program but also for editing the contents data by such as cutting, copying or inserting.

In the conventional private video recorder, a memory capacity of each segment in the contents accumulator is not so large, so that degree of disintegration that the contents data constituting one file are recorded in disintegrative into a plurality of groups of the segments will be increased by repeating the recording and erasing of the contents of TV programs. When the fragmentation frequently occurs, speed for reading out the contents data of the video picture file from the contents accumulator becomes slower. Reduction of the speed for reading out the contents data of the video picture file causes inadmissible problem in audio-visual equipment that the recording and reproducing of the contents of TV program is paused in midstream.

Furthermore, in the conventional private video recorder, the control information for controlling the contents data of the video picture file has only the location information of the segments into which the contents data constituting the same video picture file are recorded, so that the contents of the video picture file cannot be confirmed until the contents are actually reproduced on the display apparatus by reading out the contents data of the video picture file from the contents accumulator. Thus, it takes much time for reproducing or editing the contents recorded in the conventional private video recorder, so that it is not easy to use.

Still furthermore, in the conventional private video recorder, there is a fear that important contents data are instantly erased from the contents accumulator by inappropriate operation, even though the contents data can be edited by cutting, copying, inserting, and so on. When the contents data memorized into the contents accumulator are once edited, it cannot be turned back. Thus, the conventional private video recorder is not easy to use for editing the contents data of the video picture files.

Still furthermore, in the conventional private video recorder, the contents data temporarily memorized into the circulation buffer area can be read out in repeating. The contents data memorized into the circulation buffer area, however, are erased in order of memorized time when the circulation buffer area is filled. When the contents data are once erased from the circulation buffer area, it is impossible to memorize the contents data into the contents accumulator as the video picture file. For recording the contents of TV program so as to be reproduced at anytime, it is necessary to start to memorize the contents data obtained from the broadcasting signals of the TV program in the contents accumulator simultaneously with the start of on air of the TV program. If the user awakes that the contents of TV program is not recorded due to erroneous operation in midstream of the TV program, it is impossible to memorize the contents data of the contents of TV program from the start of on air.

Still furthermore, in the conventional private video recorder, when no TV program is on air while the private video recorder records the contents of TV program, the contents data corresponding to a noisy picture like sandstorm or a dark picture are memorized into the contents accumulator of the private video recorder, so that the memory capacity of the contents accumulator is fribbled away.

The following documents are known in the art of the present invention.

Publication gazette of Japanese patent application 2001-93264 shows a recording and reproducing apparatus for recording and reproducing video data and audio data by encoding and decoding the signals. The contents recorded in a plurality of discrete memory areas on a disc respectively having relativity are rearranged and rememorized into consecutive areas. By such a configuration, the fragmentation can be resolved. The contents, however, are actually rememorized into the consecutive areas on the disc, so that it needs a lot of time for rememorizing the contents. The contents or other contents cannot be recorded or reproduced while the contents are rearranged and rememorized.

Publication gazette of Japanese patent application 5-308602 shows an image processing apparatus in which data for controlling still image information can be edited. This publication gazette does not refer to the edit of video pictures (contents) of TV programs.

Japanese patent No. 2713163 shows a video recorder in which video data and audio data under nonimage condition or unpronounced condition are replaced by nonimage data code or unpronounced data code, and the replaced data codes are encoded and recoded. By such a configuration, an amount of data can be reduced, so that efficiency of an external memory apparatus can be increased. This patent, however, does not refer to not only recording the contents of TV programs but also editing of files recorded in the memory apparatus.

Publication gazette of Japanese patent application 11-184737 shows a video disc recorder, in which cluster IDs are applied to recording areas and recording information with respect to a disc array, is controlled by using the cluster IDs for preventing the occurrence of the fragmentation by repeating recording and erasing contents of video pictures. This publication gazette, however, does not refer to edit of files recorded in the disc.

Publication gazette of Japanese patent application 2001-8122 shows a digital broadcasting receiver by which TV programs recorded in the past can easily be reproduced. This publication gazette relates to selection of the TV programs and does not relate to the fragmentation, edit and recording of the contents of TV programs.

SUMMARY OF THE INVENTION

An object of the present invention is to provide a private video recorder by which contents data of video picture files can easily be edited and occurrence of fragmentation can be reduced. Another object of the present invention is to provide a private video recorder by which contents of TV program forepassed can be recorded after viewing the contents. Still another object of the present invention is to provide a private video recorder by which memory capacity of recording area can be utilized effectively without recording fribble contents.

A private video recorder in accordance with an aspect of the present invention has a file editing function for editing a video picture file by rewriting index information which is used for controlling the video picture file. The private video recorder comprises: a receiver for receiving TV broadcasting signals delivered from TV stations; a contents accumulator having a contents data memory area constituted by a plurality of segments of a predetermined memory capacity for memorizing contents data of TV program obtained from the TV broadcasting signals received by the receiver and an index information memory area for memorizing index information used for controlling the contents data memorized into the contents data memory area; an operation apparatus to be operated by a user for selecting a function among recording of the contents of TV program, editing of the recorded contents and reproducing of the recorded or edited contents; and a controller for controlling the recording, editing and reproducing of the contents.

The controller controls the contents data memorized into the segments appointed by the same segments appointing information as one video picture file.

When the recording of the contents of TV program is selected, the controller stores the contents data of TV program obtained from the TV broadcasting signals into predetermined segments in the contents data memory area, stores segment appointing information for appointing the segments memorizing the contents data into the index information memory area.

When the editing of the recorded contents is selected, the controller rewrites the segment appointing information for editing the contents data controlled as one video picture file without destructing the contents data memorized into the segments.

When the reproducing of the contents is selected, the controller reads out the contents data memorized into the contents data memory area as a unit of the video picture file so as to reproduce the recorded or edited contents.

By such a configuration, the video picture file can be edited by rewriting the appointment of the segment in the segment appointing information without cutting, copying or inserting the contents data directly. Thus, the edited video picture file can be turned back to the original state by turning back the segment appointing information. If the user is dissatisfied by the edited contents, the user can reattempt the edit of the video picture file. The contents data memorized into the segments are not rememorized and/or erased while the edit of the video picture file, so that the occurrence of fragmentation caused by repeating the recording and erasing of the contents can be reduced. As a result, the contents can be recorded and/or reproduced speedy and smoothly. Furthermore, by appointing one segment in a plurality of segment appointing information, the same contents can be shared in a plurality of video picture files, commonly.

It is possible that the controller further allocates a predetermined number of segments in the contents data memory area to a circulation buffer area into which contents data obtained from the TV broadcasting signals are constantly memorized while the TV broadcasting signals have been received.

When the operation apparatus is operated by the user so as to record the contents of TV program, the controller stores the contents data of TV program obtained from the TV broadcasting signals into predetermined segments in the contents data memory area, stores segment appointing information for appointing the segments memorizing the contents data into the index information memory area.

When the operation apparatus is operated by the user so as to record past contents of TV program already received, the controller newly forms segments appointing information for appointing the segments in the circulation buffer area into which past contents data of the past contents of TV program to be recorded are memorized into the index information memory area.

By such a configuration, the past contents of TV program already received corresponding to the contents data memorized into the circulation buffer area can be recorded in the contents accumulator, as if it is normally recorded in real time of on air of the contents of TV program. Even when the contents of TV program is not recorded due to erroneous operation in midstream of the TV program or when the user wished to record the TV program in midstream, it is possible to record the contents of TV program from the start of on air afterward.

When the operation apparatus is operated by the user so as to record the contents of TV program, the controller stores the contents data of TV program obtained from the TV broadcasting signals into predetermined segments in the contents data memory area, stores segment appointing information for appointing the segments memorizing the contents data into the index information memory area, and controls the contents data memorized into the segments appointed by the same segment appointing information as one video picture file.

When at least a segment memorizing only the contents data of no signal state or restricted viewing exists, the controller rewrites the segment appointing information appointing the segment memorizing only the contents data of no signal state or restricted the viewing so as to appoint to another segment memorizing contents data of hypothetical blank picture.

By such a configuration, the segments into which only the contents data of no signal state or restricted the viewing are memorized will replaced to one segment memorizing the contents data of the hypothetical blank picture. Thus, the segments constituting the contents data memory area are not used for memorizing the fribble contents, so that the memory capacity of the contents data memory area in the contents accumulator can be used effectively. In the reproducing of the contents recorded in the contents accumulator, the hypothetical blank picture showing the contents of no signal state or restricted the viewing is displayed on a monitor of a display apparatus, so that the user can easily understand that it is not the cause of trouble of the apparatus.

BRIEF DESCRIPTION OF THE DRAWINGS

FIG. 11 is a table for listing variety of information included in program guides.

DETAILED DESCRIPTION OF THE EMBODIMENT

Figure 1:
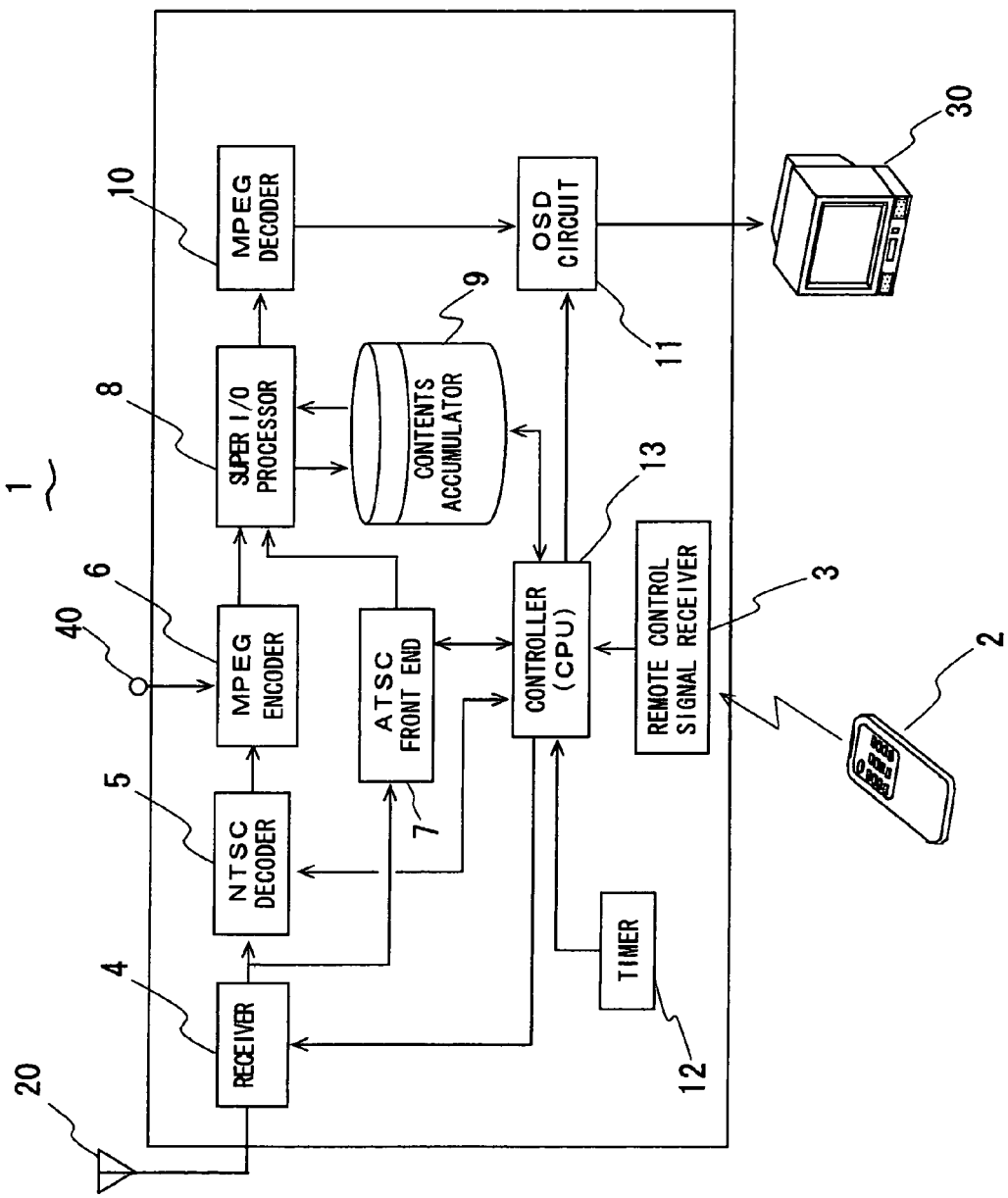
FIG. 1 is a block diagram for showing a configuration of an embodiment of a private video recorder in accordance with the present invention.

An embodiment of a private video recorder in accordance with the present invention is described with reference to figures. FIG. 1 is a block diagram of the private video recorder 1. The private video recorder 1 is connected to an antenna 20 for receiving TV broadcasting signals transmitted from TV stations. A display apparatus 30 is connected to the private video recorder 1 so as to display contents of a TV program recorded in the private video recorder 1.

The private video recorder 1 receives not only ATSC (advance television systems committee) broadcasting signals but also NTSC (national television system committee) broadcasting signals which are delivered from the TV stations through the antenna 20, recording the contents of TV programs delivered by the broadcasting signals and reproducing the recorded contents on the display apparatus 30.

The private video recorder 1 is configured by a remote control unit 2, a remote control signal receiver 3, a broadcasting signal receiver 4, an NTSC decoder 5, an MPEG encoder 6, an ATSC front end processor 7, a super I/O processor 8, a contents accumulator 9, an MPEG decoder 10, an OSD (on screen demand) circuit 11, a timer 12 and a main controller 13.

The remote control unit 2 is used by a user for operating selection of a channel of a TV program, for recording the contents of TV program included, for editing the contents recorded in the private video recorder 1, and for selecting other function of the private video recorder 1. The remote control unit 2 comprises several operation buttons enabling such the operations. The remote control unit 2 transmits wireless signals such as infrared ray signals corresponding to the operation when the user operates the operation buttons.

The remote control signal receiver 3 receives the wireless signals from the channel changer 2, and transforms the wireless signals to the corresponding control signals. The control signals are outputted to the main controller 13.

The broadcasting signal receiver 4 tunes a receiving frequency thereof to a predetermined frequency corresponding to a channel selected by the user through the remote control unit 2, and receives TV broadcasting signals on the selected channel through the antenna 20.

The NTSC decoder 5 demodulates NTSC broadcasting signals received by the broadcasting signal receiver 4 when a channel of NTSC broadcast is selected by the remote control unit 2, and outputs video data and audio data corresponding to contents of a TV program included in the NTSC broadcasting signals to the MPEG decoder 6. Furthermore, the NTSC decoder 5 extracts electric program guide included in a VBI (vertical blanking interval) signals and outputs the extracted electric program guide to the main controller 13.

The MPEG encoder 6 modulates the video data and the audio data outputted from the NTSC decoder 5 to bit stream signals by encoding and digital compression of MPEG standard. Furthermore, other video data and audio data can be inputted to the MPEG encoder 6 through external terminals 40 from the outside of the private video recorder 1. The MPEG encoder 6 converts the audio data and the video data inputted from the outside to bit stream signals. The bit stream signals converted by the MPEG encoder 6 are transmitted to the contents accumulator 9 through the super I/O processor 8.

The ATSC front end processor 7 demodulates the ATSC broadcasting signals received by the broadcasting signal receiver 4 to transport stream signals. In the transport stream signals, video data and audio data of a plurality of TV programs which are encoded and compressed by MPEG standard and an electric program guide are time shared and multiplexed. The ATSC front end processor 7 generates bit stream signals by extracting the video data and the audio data corresponding to the contents of TV program which is selected by the user through the remote control unit 2 from the transport stream signals. The ATSC front end processor 7 further extracts the electric program guide from the transport stream signals. The bit stream signals generated by the ATSC front end processor 7 are transmitted to the contents accumulator 9 passing through the super I/O processor 8. The extracted electric program guide is outputted to the main controller 13 from the ATSC front end processor 7.

The contents accumulator 9 memorizes the bit stream signals transmitted through the super I/O processor 8 under the control of the main controller 13, so that the contents of TV programs are recorded in the contents accumulator 9. The contents can be reproduced by reading out the bit stream signals from the contents accumulator 9. The bit stream signals read out from the contents accumulator 9 are outputted to the MPEG decoder 10 through the super I/O processor 8. The contents accumulator 9 is configured by recording media which can be accessed at random such as a hard disc drive apparatus (HDD), and a recordable digital versatile disc (DVD-R, DVD-RW, DVD+RW, or DVD-RAM).

The MPEG decoder 10 demodulates the bit stream signals transmitted through the super I/O processor 8 to the video data and the audio data before the compression and encoding thereof. The video data and the audio data outputted from the MPEG decoder 10 is further outputted to the display apparatus 30 through the OSD circuit 11. The OSD circuit 11 superimposes predetermined in screen display data on the video data outputted from the MPEG decoder 10. Thus, the picture of the on screen display data is displayed on the display apparatus 30 superimposed on the contents of TV program. The timer 12 counts day and time, and outputs data corresponding to the day and time to the main controller 13.

The main controller 13 controls the above-mentioned elements. Furthermore, the main controller 13 executes the following processes.

(1) Recording process for recording the contents of TV programs obtained from the TV broadcasting signals.
(2) File control process for conserving and controlling the recorded contents as video picture files.
(3) Contents reproducing process for reproducing the recorded contents.
(4) Recorded substance referring process for displaying a recorded substance reference screen on which the substance of the recorded contents can be confirmed.
(5) Nondestructive editing operation for editing the recorded contents without destructing originally recorded contents in the contents accumulator 9.
(6) Past contents recoding process for recording the contents of TV programs which has been received in past times.
(7) Hypothetical blank picture recording process for replacing the video data and audio data corresponding to contents of a TV program which are no signal state or restricted the viewing to hypothetical blank video data.

Recording Process

The recording process of the main controller 13 is described. The main controller 13 records the contents of TV programs included in the TV broadcasting signals in the contents accumulator 9 corresponding to the recording operation by the user through the remote control unit 2. As can be seen from FIG. 2, the contents accumulator 9 comprises an index information memory area 51 and a contents data memory area 52. The contents data memory area 52 memorizes the video data and the audio data corresponding to the contents of TV programs (hereupon, abbreviated as "contents data"). The contents data memory area 52 is constituted by a lot of segments 53 which are the minimum units for controlling the video picture files. Each segment 53 is further constituted to have several megabyte of memory capacity suitable for memorizing the contents data so as not to occur the fragmentation. The index information memory area 51 memorizes the index information for controlling the segments 53 in the contents data memory area 52 into which the contents data are memorized.

Figure 2:
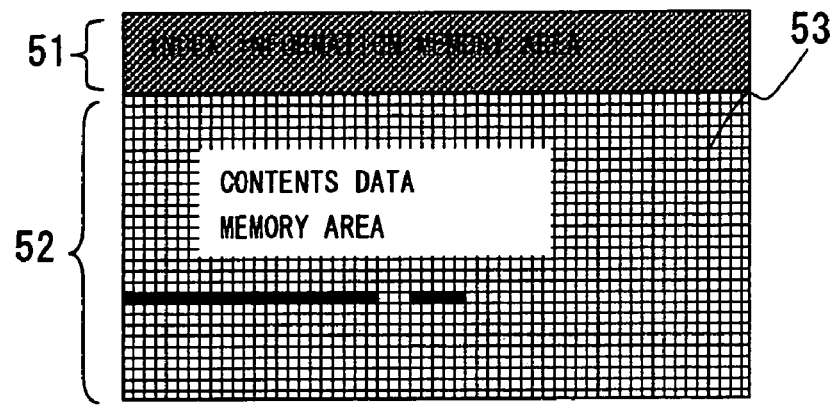
FIG. 2 is a conceptual drawing for showing a constitution of a memory area in the embodiment.
Figure 3A:
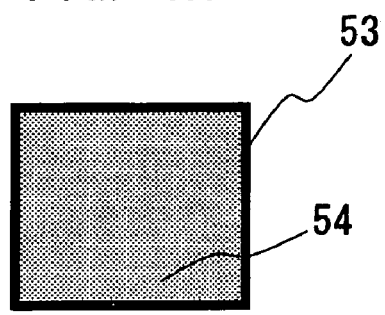
FIGS. 3A and 3B are conceptual drawings respectively for showing an occupation of memory capacity of a segment by contents data.
Figure 3B:
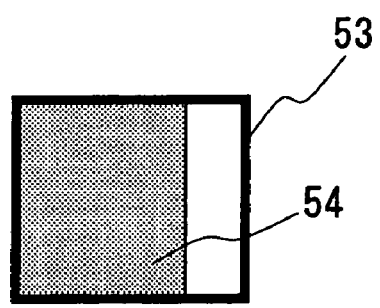

The main controller 13 stores the contents data into a plurality of segments 53 corresponding to the capacity of the contents data when the contents of TV program are recorded in the contents accumulator 9. For example, daubed boxes in FIG. 2 show the segments 53 into which the contents data constituting the same video picture file are memorized. The main controller 13 controls the recording of the contents data by unit of segment 53. The contents data are serially recorded in memory areas of each segment 53 from the top address of the memory areas in each segment 53. FIGS. 3A and 3B show conception for filling the memory area of the segment 53 by the contents data. In FIG. 3A, the memory areas of one segment 53 are fully filled by the contents data 54. In FIG. 3B, end portion of the memory areas of the segment 53 are not used for memorizing the contents data 54.

The main controller 13 forms segment appointing information for showing the addresses of the segments 53 into which the contents data are memorized, and a program guide for showing the substances of the contents data memorized into the segments 53. The segment appointing information and the program guide are respectively memorized into the index information memory area 51 as the index information. With respect to the segment 53 which is not filled by the contents data, end position information in the memory areas of the segment 53 is further included in the segment appointing information. The program guide includes variety of information, for example, listed in a table shown in FIG. 11, which is obtained from the electric program guide included in the TV broadcasting signals.

Figure 4:
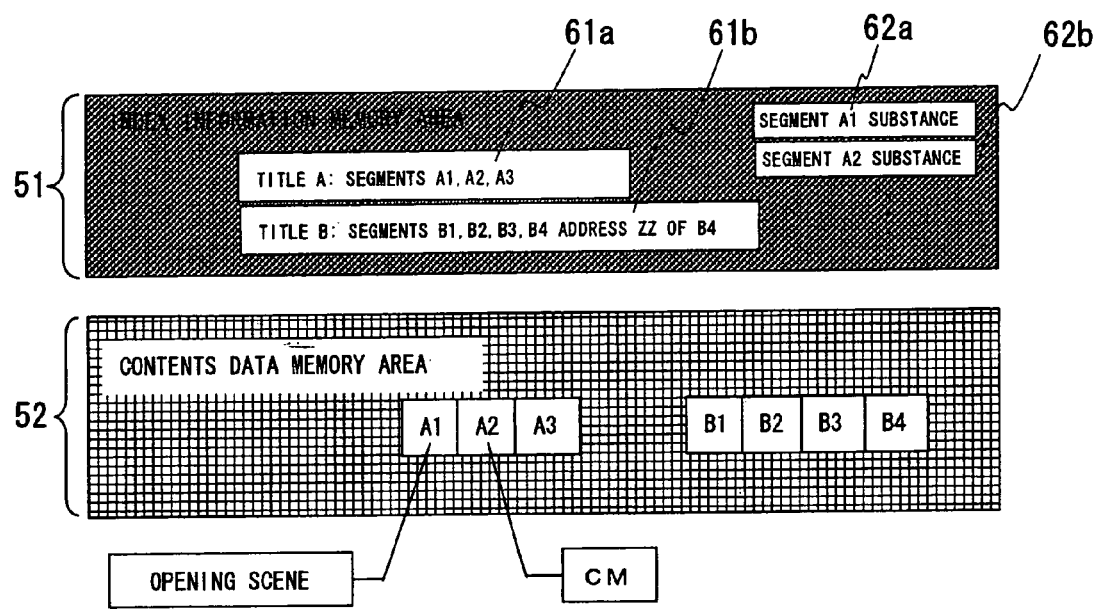
FIG. 4 is a conceptual drawing for showing constitutions of index information and contents data memorized into segments in the embodiment.

FIG. 4 shows a conception of memorizing the contents data, the segment appointing information and the program guide memorized into the contents accumulator 9. In the example shown in FIG. 4, contents data of a video picture file having a title "A" are memorized into segments designated by symbols A1, A2 and A3, and contents data of a video picture file having a title "B" are memorized into segments designated by symbols B1, B2, B3 and B4 in the contents data memory area 52.

Segment appointing information 61a for controlling the segments A1, A2 and A3 into which the contents data of the video picture file having the title "A" are memorized is memorized into the index information memory area 51. Similarly, segment appointing information 61*b* for controlling the segments B1, B2, B3 and B4 into which the contents data of the video picture file having the title "B" are memorized is memorized into the index information memory area 51. The segment appointing information 61*b* further includes the end position information that the contents data in the segment B4 is memorized till the address FF. The program guides 62*a*, 62*b*... for showing the substances of the contents data memorized the segments A1, A2 ... are memorized into the index information memory area 51.

File Control Process

The file control process by the main controller 13 is described. The main controller 13 controls the contents data of the same video picture file memorized into the segments 53 corresponding to the segment appointing information memorized into the index information memory area 51. The main controller 13 recognizes that the video picture file, for example, having the title "A" is constituted by the contents data memorized into the segments A1, A2 and A3.

Contents Reproducing Process

The contents reproducing operation by the main controller 13 is described. When the user selects to reproduce the contents of TV program, for example, having the title "A" through the remote control unit 2, the main controller 13 serially reads out the contents data memorized into the segments A1, A2 and A3 in the contents accumulator 9 with reference to the segment appointing information of the video picture file having the title "A". Subsequently, the main controller 13 outputs the contents data to the display apparatus 30. Thus, the contents of TV program selected by the user are reproduced on the display apparatus 30.

Recorded Substance Referring Process

The recorded substance referring process by the main controller 13 is described. In the recorded substance referring process, a recorded substance reference picture is displayed on the display apparatus 30. The recorded substance reference picture is a list for showing the substances of the video picture files controlled by the above-mentioned file control process, that is, the contents recorded in the contents accumulator 9.

The main controller 13 forms the recorded substance reference picture using the segment appointing information and the program guides of respective segments which are memorized into the index information memory area 51 corresponding to the operation for displaying the recorded substance reference picture by the user through the remote control unit 2. The main controller 13 outputs the data of the recorded substance reference picture to the display apparatus 30.

The recorded substance reference picture includes the information such as "date or recording", "channel number", "recording time", "reproduces or not", "title of TV program", "explanation of TV program" with respect to all the video picture files controlled by the file control process. By such the recorded substance referring process, the user can confirm the substances of the video picture files without reproducing the contents of TV program.

Nondestructive Editing Process

The nondestructive editing process by the main controller 13 is described. In the nondestructive editing process, the video picture files controlled by the segment appointing information are edited by rewriting the segment appointing information memorized into the index information memory area 51. When the user operates the remote control unit 2 so as to edit predetermined video picture file or files, the main controller 13 rewrites the segment appointing information of the video picture file or newly writes a segment appointing information corresponding to the operation by the user. By such the nondestructive editing process, the contents data of the video picture files can be edited without modifying or destructing the contents data of the video picture files. Examples of cut edit, insert edit and copy edit are described with reference to FIG. 4.

Cut Edit

It is assumed that the user operates the remote control unit 2 so as to cut a CM picture which is unnecessary scene of the video picture file having the title "A", while the user views the contents reproduced on the display apparatus 30. The contents data of the CM picture is, for example, memorized into the segment A2 in the contents data memory area 52 as shown in FIG. 4. The main controller 13 forms a backup copy of the segment appointing information 61*a* of the video picture file having the title "A" into the index information memory area 51. Subsequently, the main controller 13 rewrites the original segment appointing information 61*a* in a manner so that the contents data of the video picture file having the title "A" are memorized into the segments A1 and A3.

By such the process, the contents data corresponding to the CO picture can apparently be deleted from the contents data of the video picture file having the title "A" without modifying or destructing the original contents data memorized into the segments A1, A2 and A3. When the contents corresponding to the video picture file having the title "A" is reproduced, only the contents corresponding to the contents data memorized into the segments A1 and A3, that is, the contents from which the CM picture is deleted will be reproduced on the display apparatus 30. The user confirms the contents corresponding to the edited video picture file having the title "A" whether it is satisfactory or not.

When the user is dissatisfied by the contents corresponding to the edited video picture file, the user can turn back the edit of the video picture file by operating the remote control unit 2. When the user operates the remote control unit 2 so as to reattempt the edit of the video picture file having the title "A", the main controller 13 renders the backup copy of the segment appointing information 61*a* available. By such the process, the video picture file having the title "A" is turned back to the original state memorized into the segments A1, A2 and A3, again.

Alternatively, when the user is satisfied by the contents corresponding to the edited video picture file, the user operates the remote control unit 2 so as to finish the editing process. The main controller 13 erases the backup copy of the segment appointing information 61*a* from the index information memory area 51. When the segment A2 is not appointed by any segment appointing information, the main controller 13 erases the contents data memorized into the segment A2 and further erases the program guide 62*b* of the segment A2.

Insert Edit

It is assumed that the user operates the remote control unit 2 so as to insert a scene of a contents corresponding to the video picture file having the title "B" after a predetermined scene of the contents corresponding to the video picture file having the title "A", while the user views the contents reproduced on the display apparatus 30. Contents data corresponding to the predetermined scene in the video picture file having the title "A" is, for example, memorized into the segment A1, and contents data of the scene in the video picture file having the title "B" to be inserted is memorized into the segment B1 in the contents data memory area 52.

The main controller 13 forms a backup copy of the segment appointing information 61a of the video picture file having the title "A" into the index information memory area 51. Subsequently, the main controller rewrites the segment appointing information 61a in a manner so that the contents data of the video picture file having the title "A" are serially memorized into the segments A1, B1, A2 and A3.

By such the process, the contents data of the video picture file having the title "B" corresponding to the scene to be inserted can be inserted after the contents data of the video picture file having the title "A" corresponding to the predetermined scene without modifying or destructing the original contents data memorized into the segments A1, A2 and A3.

When the contents corresponding to the video picture file having the title "A" is reproduced, the contents data memorized into the segment B1 is read out after the contents data memorized into the segment A1. The user confirms the contents corresponding to the edited video picture file having the title "A" whether it is satisfactory or not.

When the user is dissatisfied by the edited video picture file, the user can turn back the edit of the video picture file by operating the remote control unit 2, similar to the above-mentioned cut edit process. When the user operates the remote control unit 2 so as to reattempt the edit of the video picture files, the main controller 13 renders the backup copy of the segment appointing information 61a available. By such the process, the video picture file having the title "A" is turned back to the original state memorized into the segments A1, A2 and A3, again.

Alternatively, when the user is satisfied by the edited video picture file, the user operates the remote control unit 2 so as to finish the editing process. The main controller 13 erases the backup copy of the segment appointing information 61a from the index information memory area 51.

Copy Edit

It is assumed that the user operates the remote control unit 2 so as to copy the picture of opening scene of the contents corresponding to the video picture file having the title "A", while the user views the contents reproduced on the display apparatus 30. The contents data corresponding to the picture of opening scene are, for example, memorized into the segment A1 in the contents data memory area 52.

The main controller 13 forms new segment appointing information of a video picture file having a title "C" in the index information memory area 51 corresponding to the copy operation by the user. Subsequently, the main controller 13 writs the segment appointing information that the contents data of the video picture file having the title "C" is memorized into the segment A1.

By such the process, the picture of opening scene of the contents corresponding to the video picture file having the title "A" is copied as the new video picture file having the title "C", but the contents data of the video picture file having the title "C" is originally memorized into the segment A1. When the contents corresponding to the video picture file having the title "C" is reproduced, the contents data memorized into the segment A1 is read out, so that the picture of opening scene of the contents corresponding to the video picture file having the title "A" will be reproduced. The user confirms the contents corresponding to the edited video picture file having the title "C" whether it is satisfactory or not.

When the user is dissatisfied by the edited video picture file, he can turn back the edit of the video picture file by operating the remote control unit 2, similar to the above-mentioned edit processes. When the user operates the remote control unit 2 so as to reattempt the edit of the video picture files, the main controller 13 erases the segment appointing information of the new video picture file having the title "C" from the index information memory area 51. By such the process, the video picture file having the title "C" is apparently treated that it was not produced. Alternatively, when the user is satisfied by the edited video picture file, the user operates the remote control unit 2 so as to finish the editing process.

Figure 5:
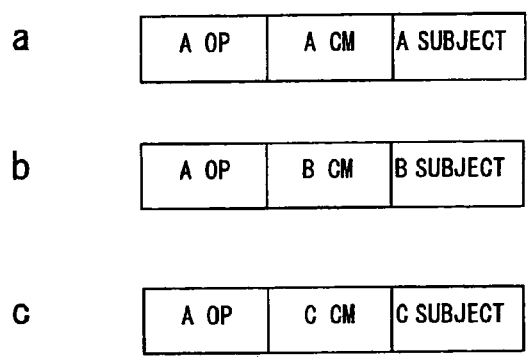
FIG. 5 is a conceptual drawing for showing examples of constitutions of video picture files edited by nondestructive editing process in the embodiment.

An application example of the nondestructive editing process is described with reference to FIG. 5. It is assumed that three video picture files of TV programs "A", "B" and "C" respectively having the same picture of opening scene are recorded. In FIG. 5, symbols "a", "b" and "c" respectively show the constitutions of the segments for memorizing the contents data of the video picture files of the TV programs "A", "B" and "C". The constitutions of the segments of the video picture files of the TV programs "A", "B" and "C" commonly have the segment designated by a symbol "A:OP" into which the contents data of the picture of opening scene of the video picture file of the TV program "A" are memorized. Such the edit can be executed by appointing the segment memorizing the contents data of the picture of opening scene of the video picture file of the TV program "A" in the segment appointing information of the video picture files of the TV programs "B" and "C". As a result, the occupation of the memory capacity of the contents data memory area 52 by memorizing the contents data of the video picture files of the TV programs "A", "B" and "C" can be reduced.

Furthermore, in the above-mentioned nondestructive editing process, the backup copy of the segment appointing information of the video picture files to be edited is memorized into the index information memory area, and is turned back when the reattempt operation is executed before completing the editing operation. Thus, the editing operation can be canceled. Such the nondestructive editing operation can be utilized for delivering the contents or video on demand using the storage type service such as electric publishing.

Past Contents Recording Process

Figure 6:
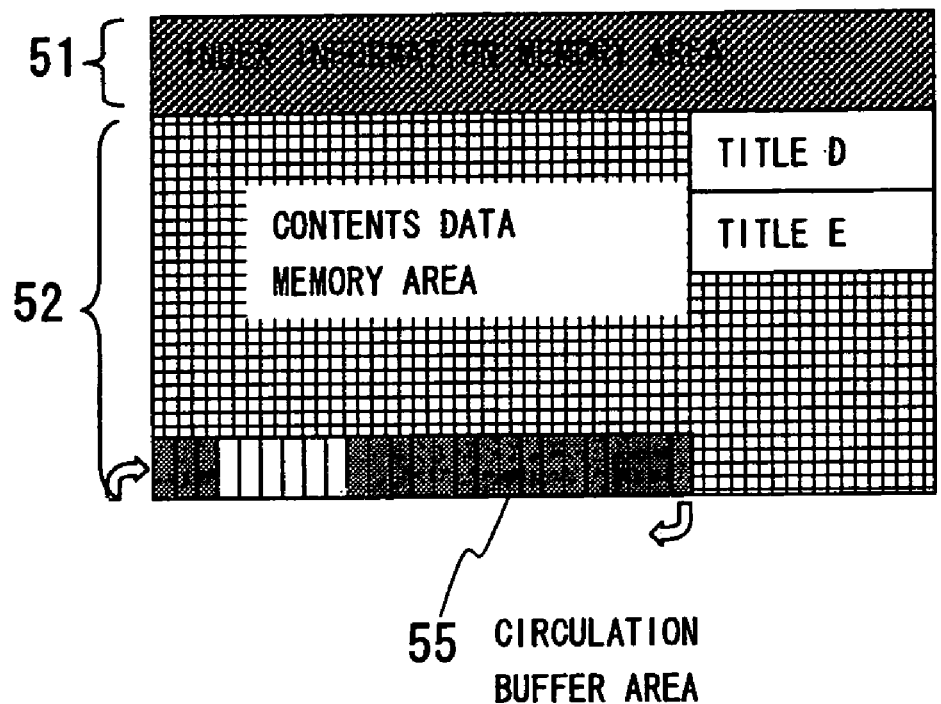
FIG. 6 is a conceptual drawing for showing a constitution of the memory area in past contents recording process in the embodiment.
Figure 7:
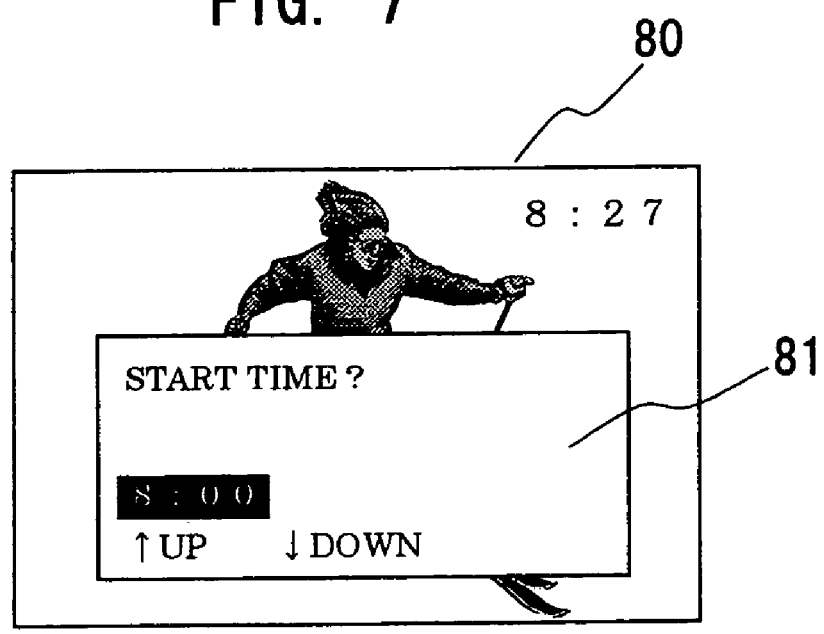
FIG. 7 is a drawing for showing a message picture superimposed on a picture of TV program in the past contents recording process.

The past contents recording process by the main controller 13 is described with reference to FIGS. 6 to 8. As can be seen from FIG. 6, a predetermined number of segments in the contents data memory area 52 are allocated to a circulation buffer area 55. Contents data of a TV program obtained from TV broadcasting signals are serially memorized into the circulation buffer area 55, while the TV broadcasting signals has been received. The main controller 13 allocates a predetermined memory capacity of the segments as the circulation buffer area 55 into which the contents data in a predetermined time, for example 60 minutes can be memorized. When the circulation buffer area 55 is filled by the contents data, the contents data memorized into the circulation buffer area 55 are serially erased in order of recorded time. Thus, the contents data in 60 minutes are constantly updated in the circulation buffer area 55. The main controller 13 stores the segment appointing information in the index information memory area 51 when the contents data are temporarily memorized into the circulation buffer area 55. The segment appointing information includes the information appointing the segments 53 into which the contents data are memorized, the program guides showing the substances of the contents data memorized into the segments 53.

In the past contents recording process, the contents data, that is, the contents of TV program included in the TV broadcasting signals already received past are memorized into the segments 53 in the contents data memory area 52 which are allocated to the circulation buffer area 55. The segments 53 for memorizing the contents data are conceptually allocated as the contents data memory area 52 and the circulation buffer area 55. Thus, the contents data which are once memorized into the segments 53 are never transmitted between the segments 53.

The main controller 13 displays a picture for the past contents recording process on the display apparatus 30 when the user operates the remote control unit 2 so as to select the past contents recording process. At this time, a message picture 81 for selecting a start time of recording, for example, shown in FIG. 7 is superimposed on a picture of TV program. The user operates the remote control unit 2 so as to search the start time of recording backward and decides the start time by following to the message displayed on the display apparatus 30. The recording of the past contents will be stopped when all the contents memorized into the circulation buffer from the start time are memorized into the segments 53 of the contents data memory area 52 or when the time period selected by the user has passed.

Figure 8:
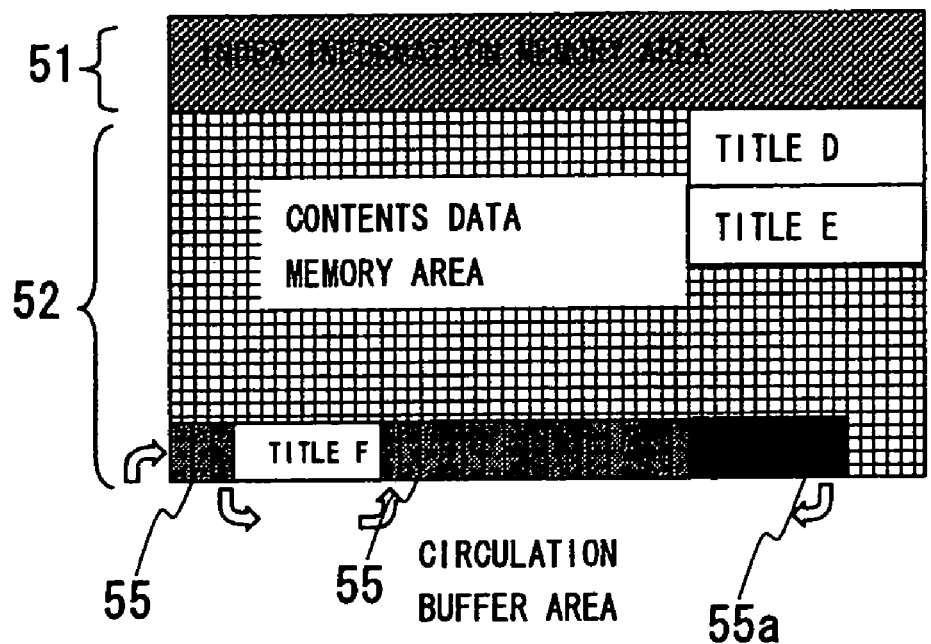
FIG. 8 is a conceptual drawing for showing allocation of circulation buffer area in past contents recording process in the embodiment.

As shown in FIG. 8, when the start time and end time of recording are selected by the user, the main controller 13 appoints the segments in the circulation buffer area 55 memorizing the contents data of the TV program which are to be recorded as a new video picture file having a title "F". Simultaneously, the main controller 13 produces segment appointing information of the video picture file having the title "F", and stores the segment appointing information into the index information memory area 51. By such the process, the past contents in the term selected by the user will be controlled as the video picture file having the title "D" as if it is normally recorded in real time of on air of the contents of TV program. Since the memory capacity of the circulation buffer area 55 is reduced due to the video picture file having the title "D" is formed, the same number of segments as the segments memorizing the contents data of the video picture file having the title "D" is newly allocated as the circulation buffer area 55.

By such the past contents recording process, the contents of TV program corresponding to the past contents data temporality memorized into the circulation buffer area 55 can be recorded afterward, while the contents of TV program is newly received. Thus, the contents of TV program already received can be recorded backwardly.

The main controller 13 can display not only the contents of TV program which is being received in real time but also the past contents corresponding to the contents data which are memorized into the circulation buffer area 55 on the display apparatus 30 corresponding to the operation by the user through the remote control unit 2. By such the configuration, the user can view the contents of TV program not only in real time but also in pausing state or in rewinding state.

In the above-mentioned embodiment, the start time of recording is selected by the user following to the message displayed on the display apparatus 30. It, however, is possible to select a predetermined time such as 30 minute, 60 minutes . . . , corresponding to the number of times that the user had pushed a predetermined operation button of the remote control unit 2.

Hypothetical Blank Picture Recording Process

The hypothetical blank picture recording process by the main controller 13 is described. In the hypothetical blank picture recording process, when all the contents data memorized into a segment are no signal state (for example, dark picture in the ATSC system and noisy picture like the sandstorm in the NTSC system), the appointment of the segment is canceled and another segment which memorizes a hypothetical blank picture is newly appointed. The hypothetical blank picture is, for example, a dark picture showing that the contents memorized into the segment was no signal state.

The main controller 13 senses whether all the contents data memorized into one segment are no signal state or not with respect to all the segments into which the contents data are memorized after the recording process, automatically. When the main controller 13 finds the segment memorizing only the contents data of no signal state, the main controller 13 rewrites the segment appointing information appointing the segment memorizing only the contents data of no signal state so as to appoint to another segment memorizing the contents data of the hypothetical blank picture. Subsequently, the main controller 13 releases the segment memorizing the contents data of no signal state, that is, erases the contents data memorized into the segment.

By such the process, all the segments memorizing only the contents data of no signal state can be replaced by one segment memorizing the contents data of the hypothetical blank picture. When the video picture file is reproduced, the hypothetical blank picture is displayed at the positions corresponding to the contents data of no signal state.

The hypothetical blank picture process can be applied for restricting the viewing of unfavorable contents by rating of the V-Chip or the micro-vision.

By such the hypothetical blank picture recording process, even when the contents data of no signal state or restricted the viewing are memorized into the segments, all the segments into which only the contents data of no signal state or restricted the viewing are memorized will be released, and one segment memorizing the contents data of the hypothetical blank picture is commonly used instead of the segments memorizing the contents data of no signal state or restricted the viewing. Thus, the segments constituting the contents data memory area 52 are not used for memorizing the fribble contents, so that the memory capacity of the contents data memory area 52 in the contents accumulator 9 can be used effectively.

Other Modifications

Figure 9:
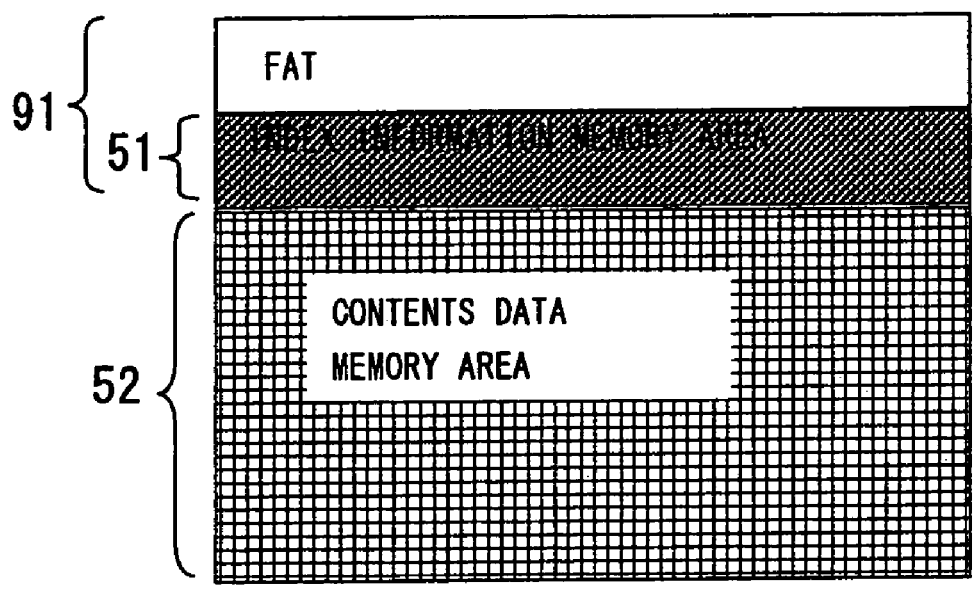
FIG. 9 is a conceptual drawing for showing a modified constitution of a memory area in the embodiment.
Figure 10:
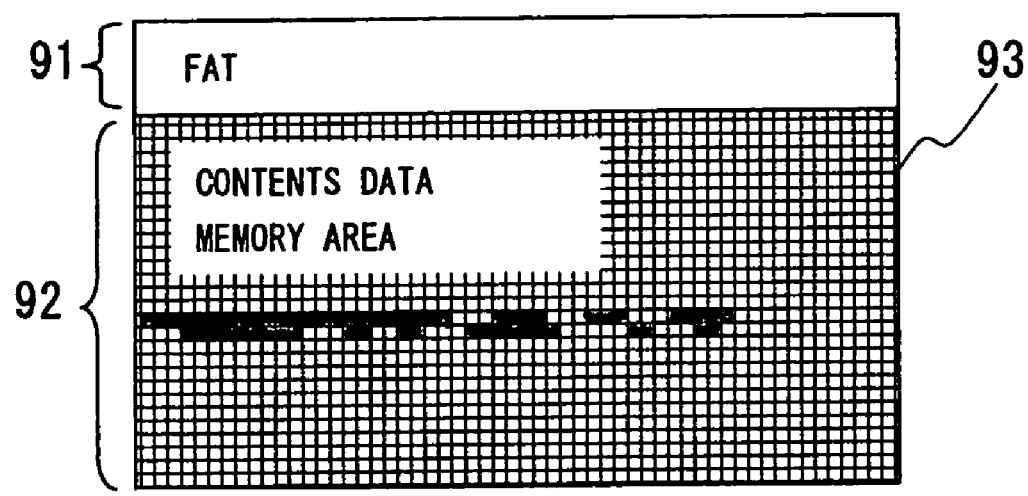
FIG. 10 is a conceptual drawing for showing a constitution of a memory area in a conventional private video recorder.

FIG. 9 shows a modified constitution of the memory area of the contents accumulator 9. As can be seen from FIG. 9, it is possible to form the index information memory area 51 logically on the file system such as FAT. Furthermore, it is possible to treat the contents data memory area 52 as one file. At this time, the index information recording area 51 utilizes a file pointer for identifying the contents data memorized into the contents data memory area 52.

It is preferable that the private video recorder 1 can receive not only the ground based broadcast signal, but also the cable-cast signals.

This application is based on Japanese patent application 2002-21014 filed in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A private video recorder having a file editing function for editing a video picture file by rewriting index information which is used for controlling the video picture file comprising:

a receiver for receiving TV broadcasting signals delivered from TV stations;

a contents accumulator having a contents data memory area constituted by a plurality of segments of a predetermined memory capacity for memorizing contents data of TV program obtained from the TV broadcasting signals received by the receiver and an index information memory area for memorizing index information used for controlling the contents data memorized into the contents data memory area;

an operation apparatus to be operated by a user for selecting a function among recording of the contents of TV program, editing of the recorded contents, and reproducing of the recorded or edited contents; and a controller for controlling the recording, editing and reproducing of the contents; wherein the controller controls the contents data memorized into the segments appointed by the same segments appointing information as one video picture file;

when the operation apparatus is operated by the user so as to record the contents of TV program, the controller stores the contents data of TV program obtained from the TV broadcasting signals into a first combination of segments controlled as one video picture file in the contents data memory area, stores segment appointing information for appointing respectively the segments in the first combination of segments memorizing the contents data into the index information memory area;

when the editing of the recorded contents stored in the first combination of segments is selected to form a second combination of segments controlled as one video picture file and distinct from the first combination of segments, the controller rewrites the segment appointing information for appointing respectively the segments in the second combination of segments without destructing the contents data memorized into the segments of the first combination of segments; and when the reproducing of the contents is selected, the controller reads out the contents data memorized into the contents data memory area as a unit of the video picture file so as to reproduce the recorded or edited contents.

2. The private video recorder in accordance with claim 1, wherein when the operation apparatus is operated by the user so as to edit the contents, the controller forms a backup copy of the segment appointing information appointing respectively the segments of the first combination of segments in the index information memory area, and rewrites the segment appointing information appointing respectively the segments of the second combination of segments, and when the operation apparatus is operated by the user so as to turn back edited video picture file after an editing operation of the contents, the controller renders the backup copy of the segment appointing information available.

3. The private video recorder in accordance with claim 2, wherein when the operation apparatus is operated by the user so as to finish the edit operation after the edit operation of the contents, the controller erases the backup copy of the segment appointing information from the index information memory area.

4. The private video recorder in accordance with claim 1, wherein when the operation apparatus is operated by the user so as to record the contents of TV program, the controller stores program guides showing substances of the contents data memorized into the segments into the index information memory area; and when the operation apparatus is operated by the user so as to execute predetermined process, the controller forms a recorded contents referring picture, in which the substances of the contents data are listed, with using the program guides memorized into the index information memory area.

5. A private video recorder having a file editing function for editing a video picture file by rewriting index information which is used for controlling the video picture file comprising:

a receiver for receiving TV broadcasting signals delivered from TV stations;

a contents accumulator having a contents data memory area constituted by a plurality of segments of a predetermined memory capacity for memorizing contents data of TV program obtained from the TV broadcasting signals received by the receiver and an index information memory area for memorizing index information used for controlling the contents data memorized into the contents data memory area;

an operation apparatus to be operated by a user for selecting a function among recording contents of TV program, editing recorded contents, and reproducing of the recorded or edited contents; and a controller for controlling the recording, editing and reproducing of the contents; wherein the controller controls the contents data memorized into the segments appointed by the same segments appointing information as one video picture file;

when the operation apparatus is operated by the user so as to record the contents of TV program, the controller stores the contents data of TV program obtained from the TV broadcasting signals into predetermined segments in the contents data memory area, stores segment appointing information for appointing the segments memorizing the contents data into the index information memory area, and controls the contents data memorized into the segment appointed by the same segment appointing information as one video picture file;

when at least a segment memorizing only the contents data of no signal state or restricted viewing exists, the controller rewrites the segment appointing information appointing the segment memorizing only the contents data of no signal state or restricted the viewing so as to appoint to another segment memorizing contents data of hypothetical blank picture; and when the reproducing of the contents is selected, the controller reads out the contents data memorized into the contents data memory area as a unit of the video picture file so as to reproduce the recorded contents.

6. The private video recorder in accordance with claim 5, wherein the controller releases the segments memorizing the contents data of no signal state or restricted the viewing after rewriting the segments appointing information.

7. The private video recorder in accordance with claim 5, wherein the controller senses whether all the contents data memorized into one segment are no signal state or restricted the viewing or not with respect to all the segments into which the contents data are memorized after the recording the contents data into the segments in the contents data memory area, automatically.

8. The private video recorder in accordance with claim 5, wherein when the operation apparatus is operated by the user so as to record the contents of TV program, the controller stores program guides showing substances of the contents data memorized into the segments into the index information memory area; and when the operation apparatus is operated by the user so as to execute predetermined process, the controller forms a recorded contents referring picture, in which the substances of the contents data are listed, with using the program guides memorized into the index information memory area.

\* \* \* \* \*

UNITED STATES PATENT AND TRADEMARK OFFICE
CERTIFICATE OF CORRECTION

PATENT NO.       : 7,636,510 B2                                        Page 1 of 1
APPLICATION NO.  : 10/353066
DATED            : December 22, 2009
INVENTOR(S)      : Takagi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 974 days.

Signed and Sealed this

Eighteenth Day of January, 2011

David J. Kappos
*Director of the United States Patent and Trademark Office*